(12) United States Patent
Ge et al.

(10) Patent No.: US 11,506,448 B2
(45) Date of Patent: Nov. 22, 2022

(54) METHOD AND DEVICE FOR MANAGING FOOD IN REFRIGERATOR

(71) Applicant: SAMSUNG ELECTRONICS CO., LTD., Suwon-si (KR)

(72) Inventors: Ying Ge, Nanjing (CN); Jia Zhang, Nanjing (CN); Zhijian Shi, Nanjing (CN); Wenxuan Li, Nanjing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/769,503

(22) PCT Filed: Nov. 14, 2018

(86) PCT No.: PCT/KR2018/013898
§ 371 (c)(1),
(2) Date: Jun. 3, 2020

(87) PCT Pub. No.: WO2020/101061
PCT Pub. Date: May 22, 2020

(65) Prior Publication Data
US 2021/0190416 A1   Jun. 24, 2021

(51) Int. Cl.
*F25D 29/00* (2006.01)
*G06Q 10/08* (2012.01)
*G06Q 30/06* (2012.01)

(52) U.S. Cl.
CPC .......... *F25D 29/00* (2013.01); *G06Q 10/087* (2013.01); *G06Q 30/0631* (2013.01);
(Continued)

(58) Field of Classification Search
CPC ............... F25D 29/00; F25D 2400/361; F25D 2500/06; F25D 2700/06
See application file for complete search history.

(56) References Cited

U.S. PATENT DOCUMENTS

| 9,965,798 B1* | 5/2018 | Vaananen | F25D 27/005 |
| 2014/0035850 A1* | 2/2014 | Shin | F25D 29/005 345/173 |

(Continued)

FOREIGN PATENT DOCUMENTS

| CN | 102981477 A | 3/2013 |
| CN | 103604273 A | 2/2014 |

(Continued)

OTHER PUBLICATIONS

YouTube Video, "LG refrigerator", Jul. 30, 2013, [retrieved on Apr. 6, 2019], Retrieved from: <URL: https://www.youtube.com/watch?v+o5mKAbiu-QA>. (5 pages total).

(Continued)

*Primary Examiner* — Jonathan Bradford
(74) *Attorney, Agent, or Firm* — Sughrue Mion, PLLC

(57) ABSTRACT

The application discloses a method for managing food in a refrigerator, including the steps of recognizing the type and quantity of the food placed in the refrigerator according to an image shot by an external camera of the refrigerator; determining a position of the food placed in the refrigerator according to images shot by internal cameras of the refrigerator; generating an AR label for recording information of the food with regard to the food placed in the refrigerator; displaying the AR label of the inquired food after receiving a food query request from a user; wherein the information of the food at least includes the type, quantity and position of the food; and displaying the images shot by the internal cameras in real time after receiving an image viewing request from the user. With the adoption of the application, the food in the refrigerator can be managed more efficiently.

16 Claims, 20 Drawing Sheets

(52) U.S. Cl.
CPC .... *F25D 2400/361* (2013.01); *F25D 2500/06* (2013.01); *F25D 2700/06* (2013.01)

(56) References Cited

U.S. PATENT DOCUMENTS

| | | | |
|---|---|---|---|
| 2015/0161871 A1* | 6/2015 | Kim | A61B 5/4561 340/539.12 |
| 2015/0161909 A1* | 6/2015 | Won | G06Q 50/10 434/127 |
| 2016/0203591 A1 | 7/2016 | Justaniah et al. | |
| 2017/0053516 A1 | 2/2017 | Wu et al. | |

FOREIGN PATENT DOCUMENTS

| | | | | |
|---|---|---|---|---|
| CN | 104482715 | A | | 4/2015 |
| CN | 104835118 | A | | 8/2015 |
| CN | 104980698 | A | | 10/2015 |
| CN | 105043005 | A | | 11/2015 |
| CN | 105091491 | A | | 11/2015 |
| CN | 204806813 | U | | 11/2015 |
| CN | 106052242 | A | | 10/2016 |
| CN | 107726703 | A | * | 2/2018 |
| CN | 108759294 | A | * | 11/2018 |
| JP | 2007046833 | A | * | 2/2007 |
| JP | 2017-15291 | A | | 1/2017 |
| KR | 10-2013-0030526 | A | | 3/2013 |
| KR | 20-2016-0003764 | U | | 11/2016 |
| KR | 20170058581 | A | * | 5/2017 |
| KR | 10-2017-0133448 | A | | 12/2017 |
| KR | 10-2018-0024265 | A | | 3/2018 |
| WO | WO-2014198554 | A1 | * | 12/2014 ............. F25D 29/00 |

OTHER PUBLICATIONS

International Search Report (PCT/ISA/210) dated Aug. 9, 2019 issued by the International Searching Authority in International Patent Application No. PCT/KR2018/013898.
Written Opinion (PCT/ISA/237) dated Aug. 9, 2019 issued by the International Searching Authority in International Patent Application No. PCT/KR2018/013898.

* cited by examiner

Gesture

Touch for a single article: the user places in the single article, and the system automatically generates a label and binds to the article

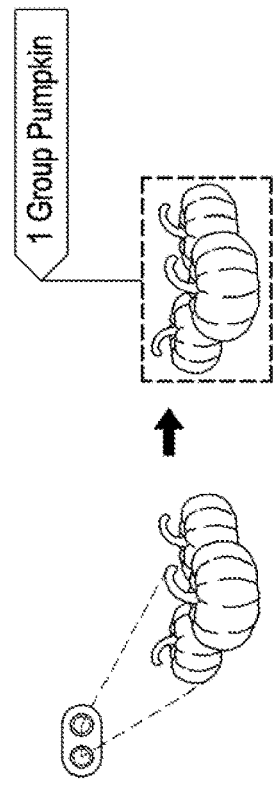

1 Tomato for a plurality of identical articles: the user place in a plurality of same variety of food, the food is automatically grouped after being placed in the refrigerator, and a label is generated and bound to the identical articles; and if the automatic grouping fails, the user can package a plurality of identical articles in a defined area as a whole for setting by drawing a grouping range manually

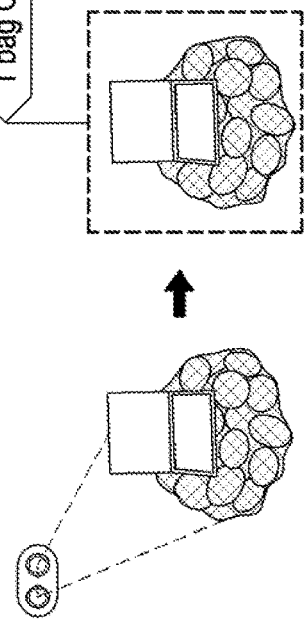

1 Group Pumpkin for a plurality of different articles: the user places in a plurality of different varieties of food, and then the system sequentially and automatically generates labels and binds to the different varieties of food

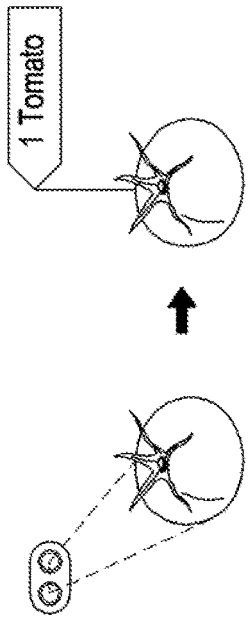

1 Tomato
2 Carrot
3 potato for a bag of articles (a bag of fruits) or food contained in a vessel, the bag of articles or the food contained in the vessel is recognized as a whole in default and a label is established

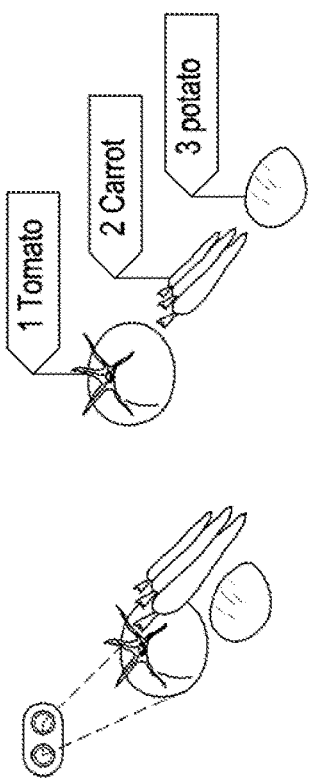

1 bag Orange

FIG.7B

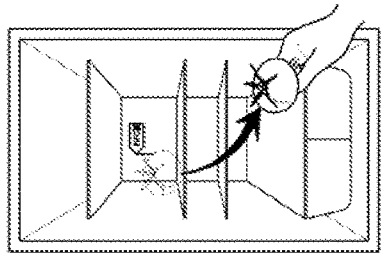

the user moves the food, and the AR label information is updated in real time according to a change of the article

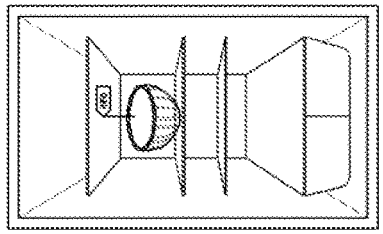

the label of the article which is not existed is canceled, and position tracking is performed on the moving article; the label of the article which is not existed is canceled

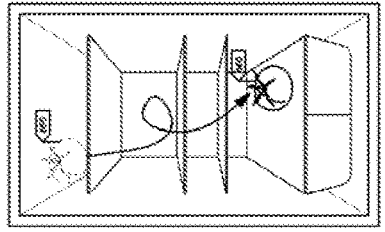

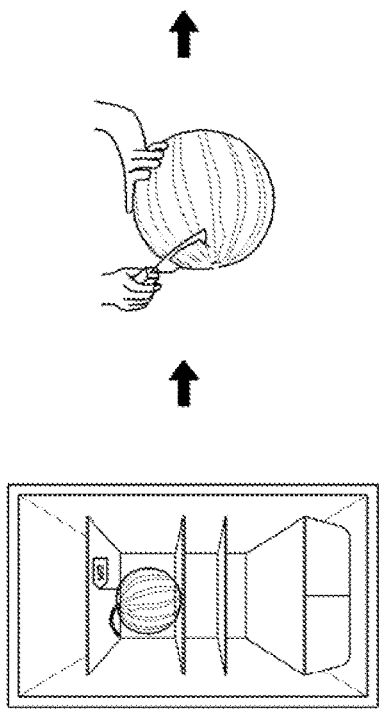

a label is reset for the same article which is regarded as a new article if this article is changed in shape or size after being taken out and then placed in back again (for example, a watermelon cut in half); the system is capable of recommending a possible name of the article to the user after comparison and judgment through the image recognition technology which assists rapid inputting of the information; and the information is stored in the storage unit after being confirmed.

FIG.7C

METHOD AND DEVICE FOR MANAGING FOOD IN REFRIGERATOR

CROSS-REFERENCE TO RELATED APPLICATION(S)

This application is a National Phase Entry of PCT International Application No. PCT/KR2018/013898, which was filed on Nov. 14, 2018, the disclosure of which is incorporated herein by reference.

TECHNICAL FIELD

The application relates to refrigerator technology and in particular to a method and device for managing food in a refrigerator.

BACKGROUND ART

In an existing refrigerator technology, management on food materials in a refrigerator mainly includes food recognition, input of food information, distribution of food placing zones and recipe recommendation.

An existing panorama technology mainly features by how to recognize and obtain images in different positions through a camera to form a panorama.

An existing AR technology is in its initial stage and is widely used, for example, the AR technology can be used in: AR headset equipment, a social system, an image and video display system, scene customization, game & education, photographing, travel guide, an intelligent dining table, an AR label, an AR book, AR processing, etc.

An existing dual-camera/multi-camera technology is mainly used for image shooting, and can realize functions including shooting angle increasing, depth-of-field increasing, image scanning, space locating, establishment of a three-dimensional model, zoom control, image correction, ranging, length measurement and so on.

DISCLOSURE OF INVENTION

Technical Problem

The existing refrigerator technology has the following problems:

1. by means of a food material viewing function of the existing refrigerator, simply a planar image can be seen, and it is difficult to see shielded food clearly;
2. after food in the existing refrigerator is taken away, the state of a shelf life label can't be updated accordingly;
3. food search of the existing refrigerator can only be performed through images and a list so it is not intuitive about how much food is about to expire;
4. the existing refrigerator can't recognize and distinguish identical food placed at different time and has no reminding information about the food not adapted to be placed together; and
5. image recognition of the food in the existing refrigerator features by comparing a plurality of images before and after or performing comparison and analysis on cut video clips, and it is required to re-take photos before observation every time, which is not convenient for user to observe and interact.

Solution to Problem

The application provides a method for managing food in a refrigerator, which can achieve management on the food more effectively.

In order to achieve the objective, the application adopts the following technical scheme.

A method for managing food in a refrigerator includes the following steps:

recognizing the type and quantity of the food placed in the refrigerator at least according to an image shot by an external camera of the refrigerator;

determining a position of the food placed in the refrigerator according to images shot by internal cameras of the refrigerator;

generating an AR label for recording information of the food with regard to the food placed in the refrigerator; displaying the AR label of an inquired food after receiving a food query request from a user; wherein the information of the food at least includes the type, quantity and position of the food; and displaying images shot by the internal cameras in real time after receiving an image viewing request from the user.

Preferably, the quantity of the internal cameras is at least two, and different internal cameras are placed in different positions;

the position of the food placed in the refrigerator is a three-dimensional spatial position determined according to the images shot by all the internal cameras; and the method further comprises:

generating an AR panorama according to the images shot by all the internal cameras after the label is generated; and displaying an image shot by a designated internal camera in real-time according to an instruction from the user, when the images shot by the internal cameras in real time are displayed.

Preferably, the method further includes: updating the position of food in the AR label of the food when a situation that the position of the food is changed is determined according to the images shot by the internal cameras.

Preferably, the method further includes: selecting an image shot by another internal camera to display the food viewed by the user, if the food viewed by the user can't be displayed completely in the image shot by the designated internal camera.

Preferably, the method further includes: when the external camera shoots food placed in the refrigerator, shooting the user by the external camera, acquiring information of the user who places in the food, and adding the information of the user who places in the food to the AR label of the food.

Preferably, the method further includes: determining the food moved out of the refrigerator according to the images shot by the internal cameras and the external camera, determining the position of the food moved out of the refrigerator according to the images shot by the internal cameras, and determining the information of the food moved out of the refrigerator according to this position; and updating the AR label corresponding to the food moved out of the refrigerator.

Preferably, the method further includes: when the food placed in the refrigerator and the food moved out of the refrigerator are identical in type and different in size and/or shape, recommending the AR label of the food moved out of the refrigerator to the user to act as the AR label of the food placed in the refrigerator.

Preferably, wherein the information of the food includes a shelf life; the method further includes: screening and displaying the food and the AR label of the food through the shelf life of the food after receiving the query request of the user;

and/or, the information of the food includes note information for receiving user-defined information input by the user.

Preferably, wherein the shelf life of the food is determined according to user input, or, the shelf life of the food is determined according to the placing-in time and a shelf life of similar food; and/or, the method further comprises: when the situation that the food is already expired is determined according to the shelf life of the food, reminding the user that the food is already expired.

Preferably, wherein the information of the food includes placing-in time, and the method further includes: recommending the food having earlier placing-in time in the identical food to the user after receiving a recommendation request of the user;

and/or, judging the type of food in an adjacent position according to the images shot by the internal cameras, and reminding the user to store the food separately if the type of the food in the adjacent position belongs to a preset designated combination.

Preferably, wherein the designated combination is vegetables and fruits, and/or, the designated combination is raw food and cooked food, and/or the designated combination is foodstuff and medicines.

Preferably, the method further comprises: selecting food in a designated time period according to the placing-in time of the food in response to a request of the user, marking out the selected food from a background of the shot images according to the images shot by the internal cameras and displaying the selected image in a highlighting manner, when the information of the food comprises the placing-in time.

Preferably, the method further includes: reminding the user that some food is possibly expired when the storage period of the food in the refrigerator exceeds a first set time period, based on the placing-in time of the food and the images shot by the internal cameras; and/or, the method further includes: reminding the user that some food is possibly expired, when the storage period of the food which hasn't been moved in the refrigerator exceeds a second set time period based on the placing-in time and the position of the food and the images shot by the internal cameras.

Preferably, the method further includes: searching price information of identical food on the Internet according to label information of the food, and showing a search result to the user.

Preferably, the method further includes: selecting food and label information of the food according to the food required in a recipe designated by the user and showing the food and the label information of the food to the user.

A device for managing the food in the refrigerator, including: an image recognition unit, a setting unit and an interaction unit;

the image recognition unit is used for recognizing the type and quantity of the food placed in the refrigerator according to an image shot by an external camera of the refrigerator, and determining the position of the food placed in the refrigerator according to images shot by internal cameras of the refrigerator;

the setting unit is used for generating an AR label for recording the information of the food with regard to the food placed in the refrigerator, and displaying the AR label of an inquired food after receiving a food query request from a user; wherein the information of the food at least includes the type, quantity and position of the food; and the interaction unit is used for displaying images shot by the internal cameras in real time after receiving an image viewing request from the user.

Advantageous Effects of Invention

It can be seen from the scheme above that according to the present application, the type and quantity of the food placed in the refrigerator are recognized according to the image shot by the external camera of the refrigerator; the position of the food placed in the refrigerator is determined according to the images shot by the internal cameras of the refrigerator; the AR label is generated with regard to the food placed in the refrigerator and used for recording the information of the food; and the AR label of the inquired food is displayed after the food query request from the user is received; wherein the information of the food at least includes the type, quantity and position of the food. Through the scheme above, food information can be recognized more accurately and marked with combination of the external camera and the internal cameras. Further, the images shot by the internal cameras are displayed in real time after the image viewing request from the user is received. Through the scheme above, real-time images of the cameras can be displayed without opening and closing a refrigerator door to initiate to shoot and display a latest refrigerator internal image.

BRIEF DESCRIPTION OF DRAWINGS

FIG. 7a, FIG. 7b, FIG. 7c and FIG. 7d are schematic diagrams of Example 3;

MODE FOR THE INVENTION

In order to make the purpose, technical means and advantages of the application more clear, the application will be described in detail in combination with the accompanying drawings.

In this application, a refrigerator is provided with an external camera and internal cameras. So, food information and user operation can be recognized more accurately with combination of the external camera and the internal cameras. Meanwhile, the quantity of the internal cameras is at least two so as to obtain images at different angles.

Figure 1:
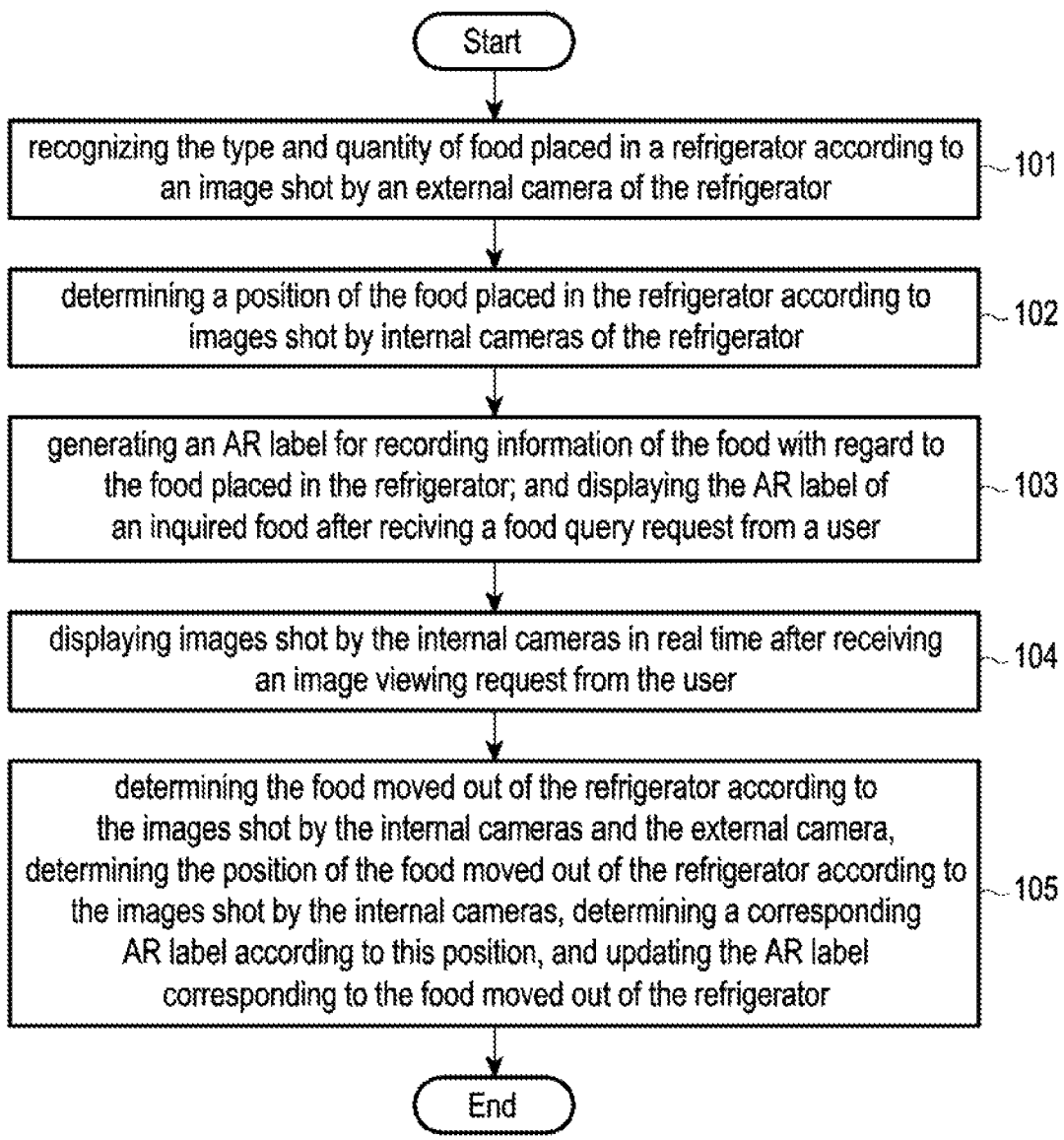
FIG. 1 is a schematic diagram of a basic procedure of a method for managing food in a refrigerator according to the present application.

FIG. 1 is a schematic diagram of a basic procedure of a method for managing food in a refrigerator according to the present application. As shown in FIG. 1, the method includes the following steps.

In step 101, the type and quantity of the food placed in the refrigerator are recognized according to an image shot by the external camera of the refrigerator.

In addition, user information of a person who places in the food is further recognized by the external camera, In step 102, the position of the food placed in the refrigerator is determined according to images shot by the internal cameras of the refrigerator.

In step 103, an AR label for recording information of the food is generated with regard to the food placed in the refrigerator; and the AR label of the inquired food is displayed after receiving a food query request from a user.

And the information of the food may at least include the type, quantity and position of the food.

And In step 104, images shot by the internal cameras in real time are displayed after receiving an image viewing request from the user.

The steps above are specific processings when the food is placed in the refrigerator. And when the food is taken out of the refrigerator, the method may further include the following step 105.

In step 105, the food moved out of the refrigerator is determined according to images shot by the internal cameras and the external camera, the position of the food moved out of the refrigerator is determined according to the images shot by the internal cameras; the corresponding AR label according to this position is determined; and the AR label corresponding to the food moved out of the refrigerator is updated.

Specific conditions for determining that the food is moved out of the refrigerator can be set as needed. For example, the internal cameras may capture a specific operation of a hand, and the food may be found disappeared according to the images shot by the internal cameras, so that it may be determined that the food is taken away.

To achieve the method for managing the food in the refrigerator of the present application, the refrigerator can include the following processing units: an image recognition and processing unit, an analysis and comparison unit, an interaction unit, a setting unit, a storage unit, a query unit and a reminding unit.

Functions and processing of the above various units are described below in detail.

1. Image Recognition and Processing Unit

This image recognition and processing unit is mainly used for people recognition, food recognition in the refrigerator and an AR panorama generation, and mainly includes the following functions.

1) Since the refrigerator is provided with a plurality of cameras, the position of food may be recognized through internal cameras, and the type, quantity of the food and a user may be recognized through an external camera.

2) Not only a current image of an article may be recorded, but real-time three-dimensional space locating on the position of an article may also be performed through a plurality of cameras, by means of image recognition, 3) A main body may be separated from a background after the image recognition, an image may be marked out and displayed in a highlighting manner so as that the food required or currently searched by the user may be displayed.

2. Analysis and Comparison Unit

This analysis and comparison unit is used for recording, analyzing and comparing changes of AR images in the refrigerator, and mainly includes the following functions.

1) Changes of the position of the food in the refrigerator may be analyzed and compared in real time, and the panorama may be automatically updated.

2) The label of an article which is not existed may be cancelled. Position tracking on a moving article may be performed. The label of a same article whose shape or size is changed after being taken out and then placed in back again should be reset as the article should be regarded as a new one (for example, a watermelon cut in half). And label information (such as the name of a kind of food. etc) of the food that is moved-out may be recommended to the user when finding out that the types of the food placed in and that of the food moved out are identical after comparison and judgment through an image recognition technology which assists a rapid information inputting.

That is to say, when the food placed in the refrigerator and the food moved out of the refrigerator are of identical type but are different in size and/or shape, the AR label of the food moved out of the refrigerator may be recommended to the user to act as the AR label of the food placed in the refrigerator.

3) When a kind of food is placed in, the placing-in time may be added to the food information. And the food which is placed in earlier may be recommended to the user to be eaten through comparing and recognizing the placing-in time of food of the same kind.

4) The types of adjacent food may be recognized and a reminder may be sent to the user to store the adjacent food separately if the adjacent food is detected to be a preset food combination. For example, if vegetables and fruits are placed together (the fruits will release ethylene and thus the vegetables will turn yellow), a reminder may be sent to the user to store the vegetables and fruits separately. And if raw food and cooked food are placed together, a reminder may be sent to the user to store the raw food and cooked food separately. In addition, a suggestion may also be sent to the user to store foodstuff and medicines separately.

5) Whether a kind of food is possibly expired may be judged by recognizing an article which hasn't disappear or hasn't been moved for a long time. After a period of time, an area where the article is moved most frequently and an area where the article is moved rarely may be calculated and marked. More specifically, a reminder may be sent to the user to reminder the user that a kind of food may be possibly expired, if the storage period the food in the refrigerator exceeds a first preset time period based on the placing-in time of the food and the images shot by the internal cameras. And/or, a reminder may be sent to the user to reminder the user that a kind of food may be possibly expired, if the period of which the food hasn't been moved in the refrigerator exceeds a second preset time period based on the placing-in time, the position of the food and the images shot by the internal cameras.

3. Interaction Unit

This interaction unit is mainly used for recognizing touch/non-touch operations performed by the user in a panorama operating process. Main interactions are as follows.

1) A touch operation, including a touch screen operation such as clicking and sliding. The touch operation may be used for article viewing, screening, information inputting, and etc.

2) A non-touch operation, including actions like viewing and selecting a panorama across a separated place. The non-touch operation may be realized based on a three-dimensional gesture recognition technology.

This interaction unit provides an automatic AR feedback effect.

1) With regard to a shielded article, the system will automatically "convert a visual angle" for the user; by rotating the direction of the panorama and adjusting a visual angle, so that the user can view at an angle with facilitating viewing. More specifically, if the food viewed by the user can't be displayed completely in the image shot by the designated internal camera, the image shot by another internal camera may be selected to display the food viewed by the user.

2) With regard to the food already expired, the area or the article will be surrounded by a circle of AR special effect to remind the user that treatment is required here.

3) With regard to a sterilization application, the user can see a sterilization dynamic effect surrounding a specific layer of food and the angle to view a sterilization process and state from different positions may be adjusted.

4. Setting Unit

This setting unit is mainly used for setting and inputting a food label, which mainly includes the following modules.

1) An AR label setting module, for generating an AR label of food, and binding the label with an article. When the position of the article is changed, the position of the label is changed accordingly. And after the article is taken away, the original label disappears automatically.

And setting objects include:
setting a label for a single article: a label may be generated automatically and bound to an article when an external camera on a refrigerator door recognizes the article, and the article is placed in the refrigerator;
setting labels for a plurality of different articles: labels may be generated sequentially and automatically and bound to several articles when an external camera on a refrigerator door recognizes the types and quantities of the articles (such as one apple and one pear), and the articles are placed in the refrigerator;
setting a label for a plurality of identical articles: a label may generated and bound to a kind of articles when an external camera on a refrigerator door recognizes the types and quantities of the articles, and the articles are automatically grouped after being placed in the refrigerator; and if the automatic grouping fails, the user may package a plurality of identical articles in a defined area as a whole for setting by drawing a grouping range manually.
for a bag of articles (a bag of fruits) or food contained in a vessel, the bag of articles or the food contained in the vessel may be recognized as a whole in default and a label is established;

2) An automatic recording module, for inputting automatically dates of the placement of articles, user information, types of articles, images, quantities, etc.; and automatically judging whether an article which is changed in shape or size after being taken out and then being placed back in is the same as the previous article; and if so, recommending a name of the article to the user.

3) A manual recording module, for inputting manually information such as a detailed shelf life.

5. Storage Unit

This storage unit is mainly used for storing information. And the storage unit mainly includes the following modules.

1) An image storage module, for storing AR panorama information of the food in the refrigerator.

2) A user information storage module, for storing the user information including face and height information.

3) A label information storage module, for storing set and updated AR label information;

4) A recipe storage module, for storing information of recipes capable of being formed by various raw materials.

5) A food combination storage module, for storing information about which food can't be placed in the refrigerator or placed together.

6) An interaction instruction storage module, for storing gestures and touch instructions corresponding to the user operation.

6. Query Unit

This query unit is mainly used for collecting an interaction instruction, matching an interaction mode recognized by the interaction unit with a preset interaction mode of the storage unit, and initiating a corresponding instruction for performing related operation if the interaction mode and the preset interaction mode are identical. The query unit mainly includes the following modules.

1) An image viewing module, for collecting the interaction instruction and performing panorama viewing related operation; wherein a shielded article is presented to the user in a "convert a visual angle", so that the user may view the article from another side.

2) A shelf life query module, for collecting the interaction instruction and screening and displaying food according to a shelf life; wherein if the user doesn't input shelf life information, the system inquiries a date recorded automatically when the article is placed in, compares it with possible expired time of different food, then judges a freshness state of the food.

3) An AR label query module, for collecting the interaction instruction, executing query operation, and displaying detailed label information.

4) A recipe raw material query module, for collecting the interaction instruction, executing query operation, and displaying information of required raw materials in a highlighting manner.

7. Reminding Unit

This reminding unit is mainly used for realizing food state reminding functions, mainly including the following functions.

1) Expiration reminding, for giving a reminder in a visual label form with regard to the food about to expire; wherein it may be judged whether the food is possibly expired by recognizing the article which hasn't disappear or hasn't been moved for a long time based on the placing-in time of the food; or the expiration time may be calculated based on the shelf life input manually; and with regard to the food already expired, the area or the article will be surrounded by a circle of AR special effect to remind the user that processing is required there.

2) Preferred eating recommendation, for recognizing the placing-in times of two articles of a same kind and recommending to the user to eat the food placed in earlier.

3) Placement reminding, for giving reminders about not placing different kinds of foods together, after the types of food are recognized.

4) price reminding, for displaying commodity price information from nearby supermarkets in the label automatically, and giving reminders in case of discounts (for example, discount information may be popped up when eggs are at a discount).

The described above are the functions and processing of the various units.

For the method for managing the food in the refrigerator according to the present application, the method can be divided into a plurality of procedures according to different needs to complete corresponding processing. The procedures are described below in detail.

1. An information recognition and storage procedure, including the following steps.

1) The image recognition and processing unit recognizes information of a user including the information of face and height;

2) The image recognition and processing unit acquires information like an image, the type, and the quantity of food.

3) The user places in an article. The setting unit automatically generates an AR label and inputs the placing-time of the article when the article is placed in, and other information is recorded manually;

4) The image recognition and processing unit performs three-dimensional spatial locating on the position of the food. The analysis and comparison unit analyzes and compares images of the article when the article is placed in and that of the article taken out and a change of the spatial position of the article; and the image recognition and processing unit generates and updates an AR panorama according to information of the images. and 5) User information, the panorama, information of the position of the food and information of the AR label will be stored in the storage unit.

Figure 2:
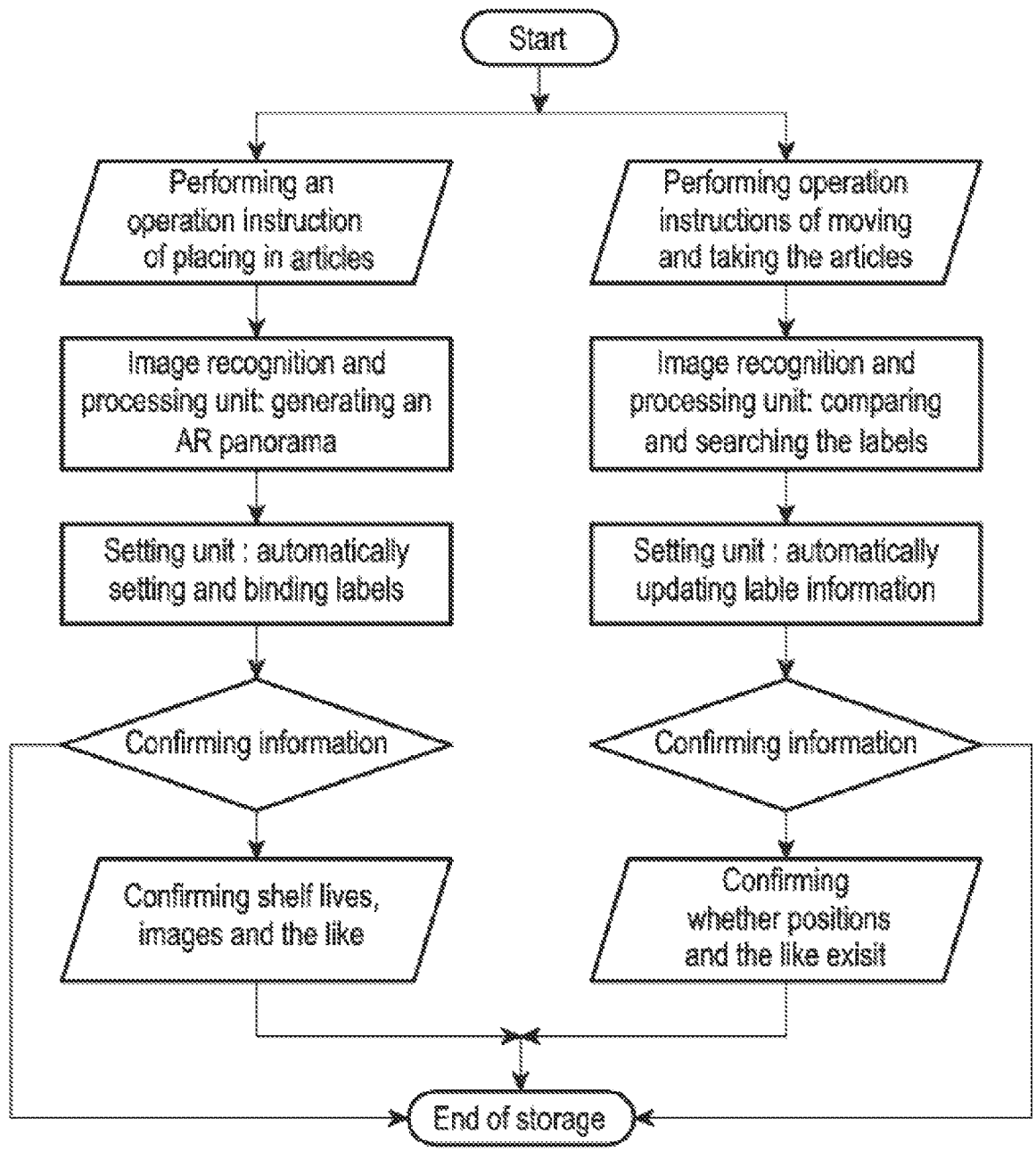
FIG. 2 is a schematic diagram of a label setting procedure.

2. A label setting procedure (as shown in FIG. 2), including the following steps.

Food is identified.

wherein the external camera on the refrigerator door recognizes the types and quantities of the articles;

The food is placed in.

Wherein 1) For a single article: the user places in the single article, the system automatically generates a label and binds to the article, the image recognition and processing unit generates an AR panorama, and the AR panorama is stored in the storage unit after information is confirmed.

2) For a plurality of different articles: the user places in a plurality of different varieties of food, and then the system generates labels and binds to the varieties of food sequentially and automatically; and the image recognition and processing unit generates an AR panorama, and the AR panorama is stored in the storage unit after information is confirmed.

3) For a plurality of identical articles: the user places in a plurality of same variety of food, the food is automatically grouped after being placed in the refrigerator, and a label is generated and bound to the same variety of food; and if the automatic grouping fails, the user may package a plurality of identical articles in a defined area as a whole for setting by drawing a grouping range manually. And 4) for a bag of articles (a bag of fruits) or food contained in a vessel, the bag of articles or the food contained in the vessel may be recognized as a whole in default and a label is established.

The food is moved.

Wherein 1) the user moves the food, and the analysis and comparison module compares positions of the article in the refrigerator before and after be moved and searches the label of the food. And 2) the label setting module of the setting unit updates information of the label, cancels the label of an article which is not existed. Position tracking on a moving article may be performed. A label for the same article which is regarded as a new article if this article is changed in shape or size after being taken out and then placed in back again (for example, a watermelon cut in half) is reseted. The system is capable of recommending a possible name of the article to the user after comparison and judgment through the image recognition technology which assists a rapid information inputting; and the information is stored in the storage unit after being confirmed.

Figure 3:
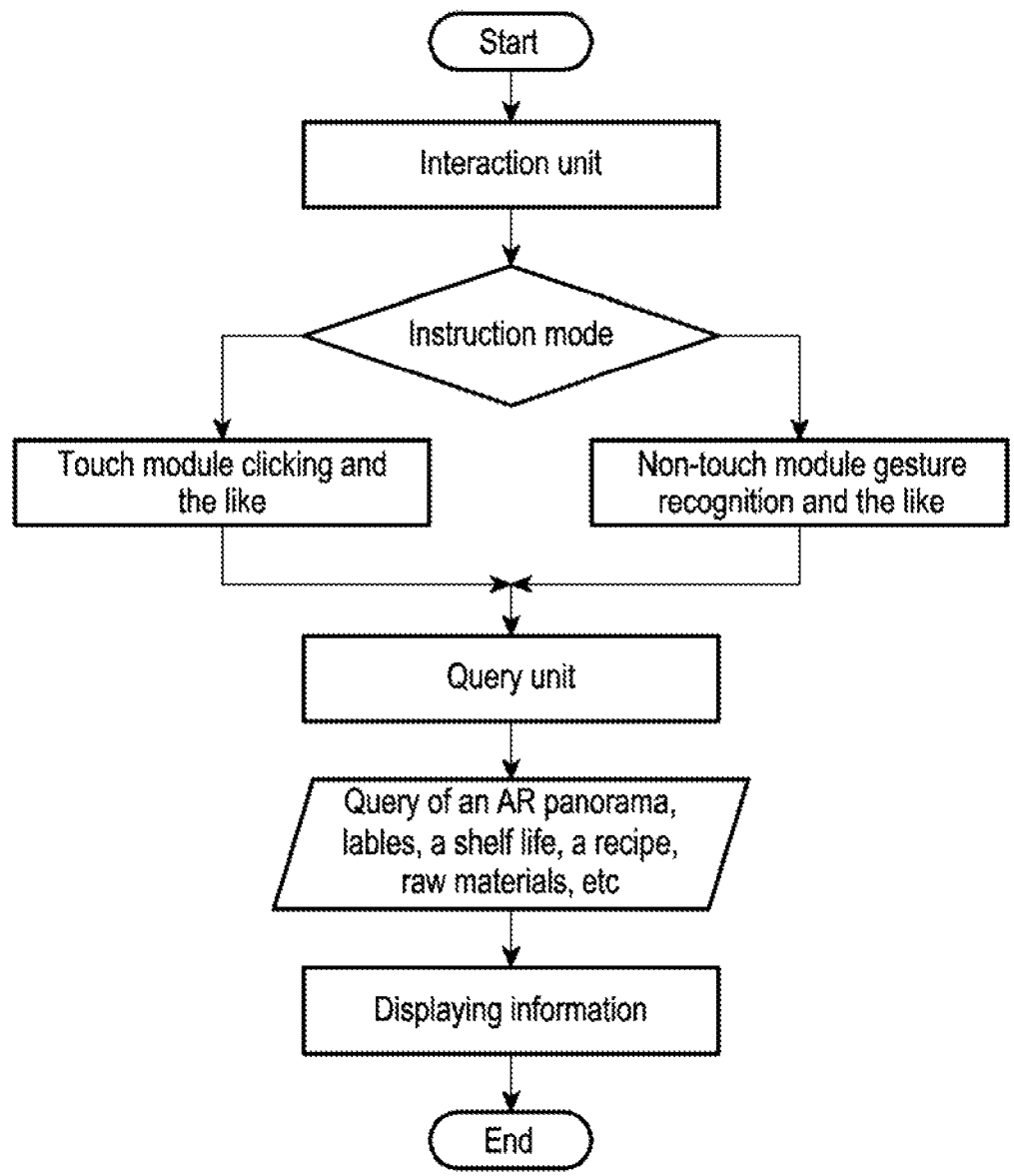
FIG. 3 is a schematic diagram of an information query procedure.

3. An information query procedure (as shown in FIG. 3) includes the following steps.

1) The interaction unit recognizes a user gesture instruction according to a user gesture, classified as a touch instruction and a non-touch instruction.

and 2) The query unit views the AR panorama according to an user instruction, screens and displays the food through the shelf life, and displays the detailed label information, and displays raw materials of a recipe in a highlighting manner according to a selection instruction of the recipe of the interaction unit.

Figure 4:
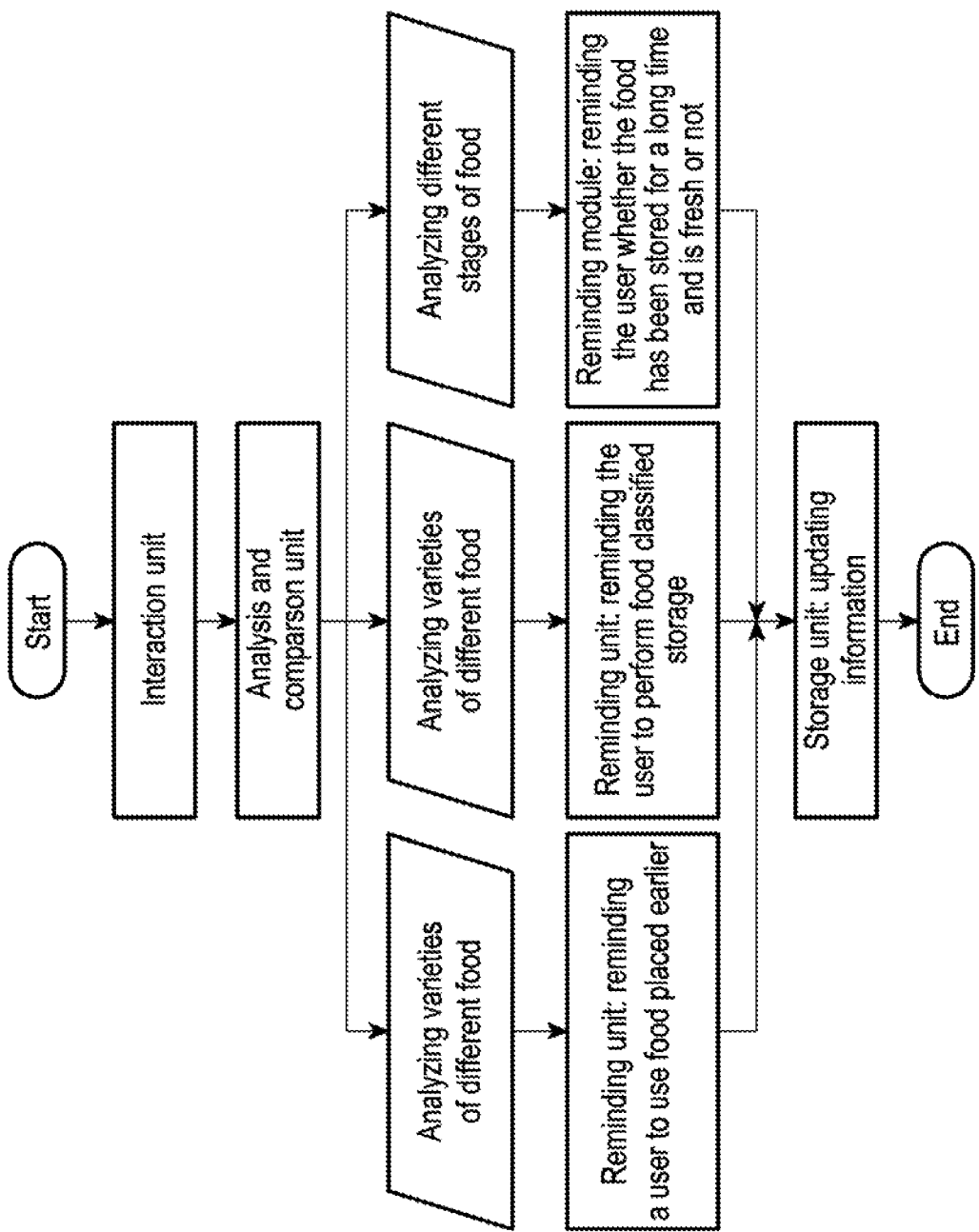
FIG. 4 is a schematic diagram of an analysis and comparison and reminding procedure.

4. An analysis and comparison and reminding procedure (as shown in FIG. 4) includes the following steps.

1) The interaction unit recognizes a user action. The analysis and comparison unit compares and recognizes the placing-in time of identical food which is placed in before and after, and the reminding unit recommends the food placed in earlier to the user to be eaten.

2) The interaction unit recognizes a user action. The analysis and comparison unit recognizes the types of adjacent food in the refrigerator, and the reminding unit reminds the user to store the adjacent food separately if vegetables and fruits are placed together (the fruits will release ethylene and thus the vegetables will turn yellow) and the raw food and the cooked food are placed together are detected, and the reminding unit also suggests the user to store the foodstuff and the medicines separately.

3) The system finds food (fresh, to be eaten as soon as possible, not fresh) at different time stages according to an instruction of the interaction unit. The image recognition and processing unit marks out an image outline from the background, and the reminding unit reminds the image in a highlighting display form. And 4) the interaction unit recognizes a user action, and judges whether the food is possibly expired by recognizing the article which is existed or not moved for a long time; and after a period of time, an area where the article is moved rarely is calculated out and marked, and a reminder is sent to the user.

Specific examples of several procedures are given below.

Figure 5A:
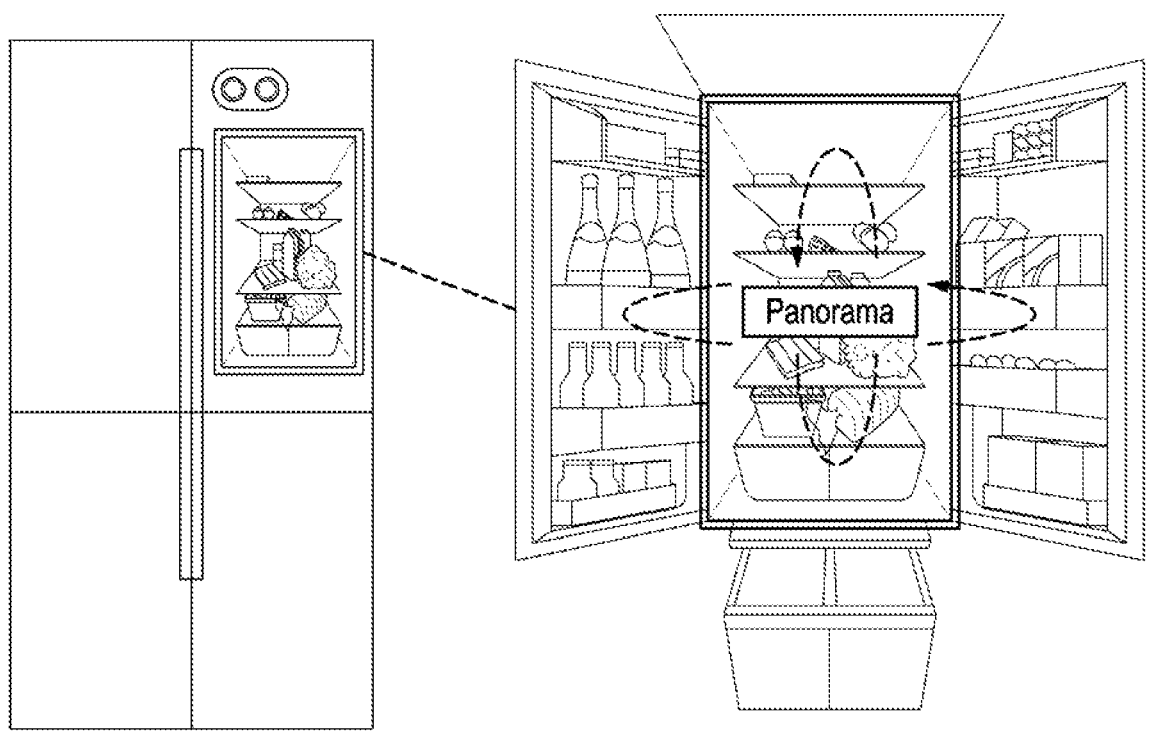
FIG. 5a, FIG. 5b and FIG. 5c are schematic diagrams of Example 1.
Figure 5B:
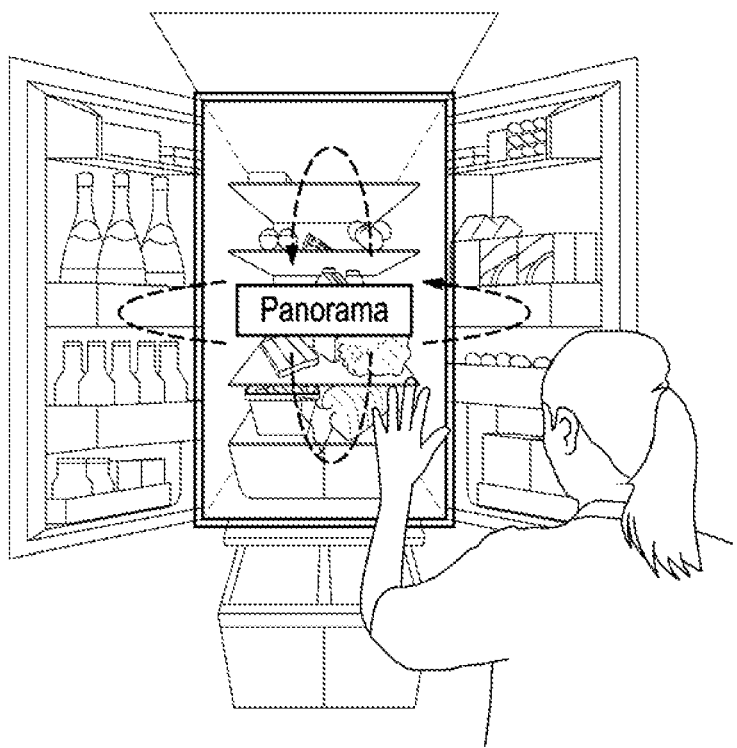
Figure 5B:
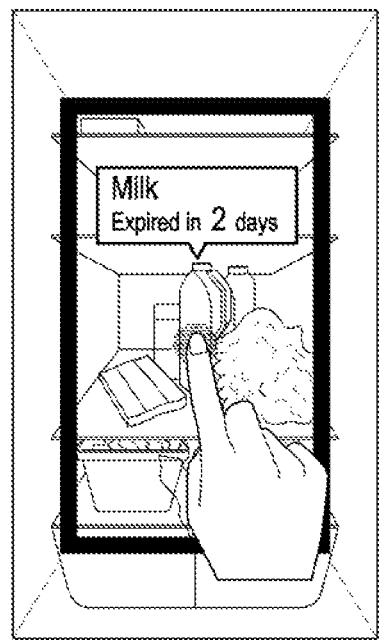
Figure 5C:
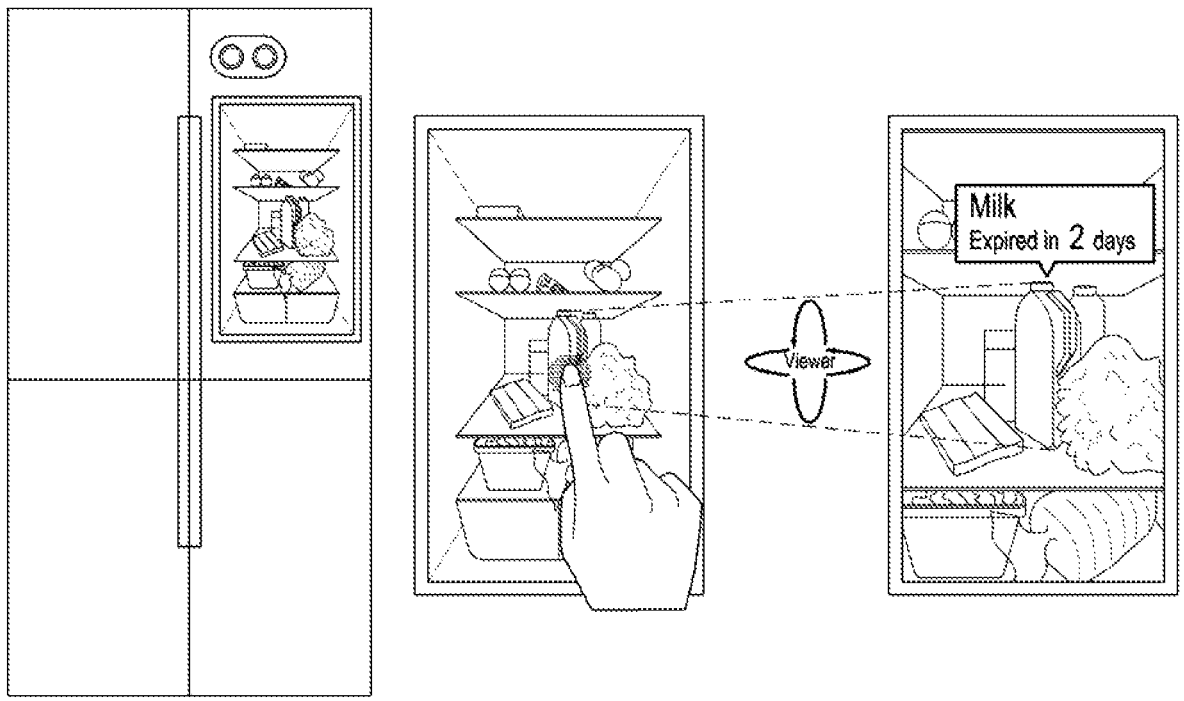

Example 1: panorama interaction (as shown in FIG. 5a-FIG. 5c) includes the following steps.

In step 1: a 360-degree omnidirectional panorama (FIG. 5A) is formed by images shot by cameras so that a user may select to view the panorama at any visual angle as desired, including two side doors and the back.

In step 2: food in the panorama is viewed through gesture interaction and touch interaction (FIG. 5b). And in step 3: a visual angle conversion is automatically performed. The position of a user viewing and the angle of a target article are adjusted, and the contents of an AR label is displayed (FIG. 5c).

Figure 6:
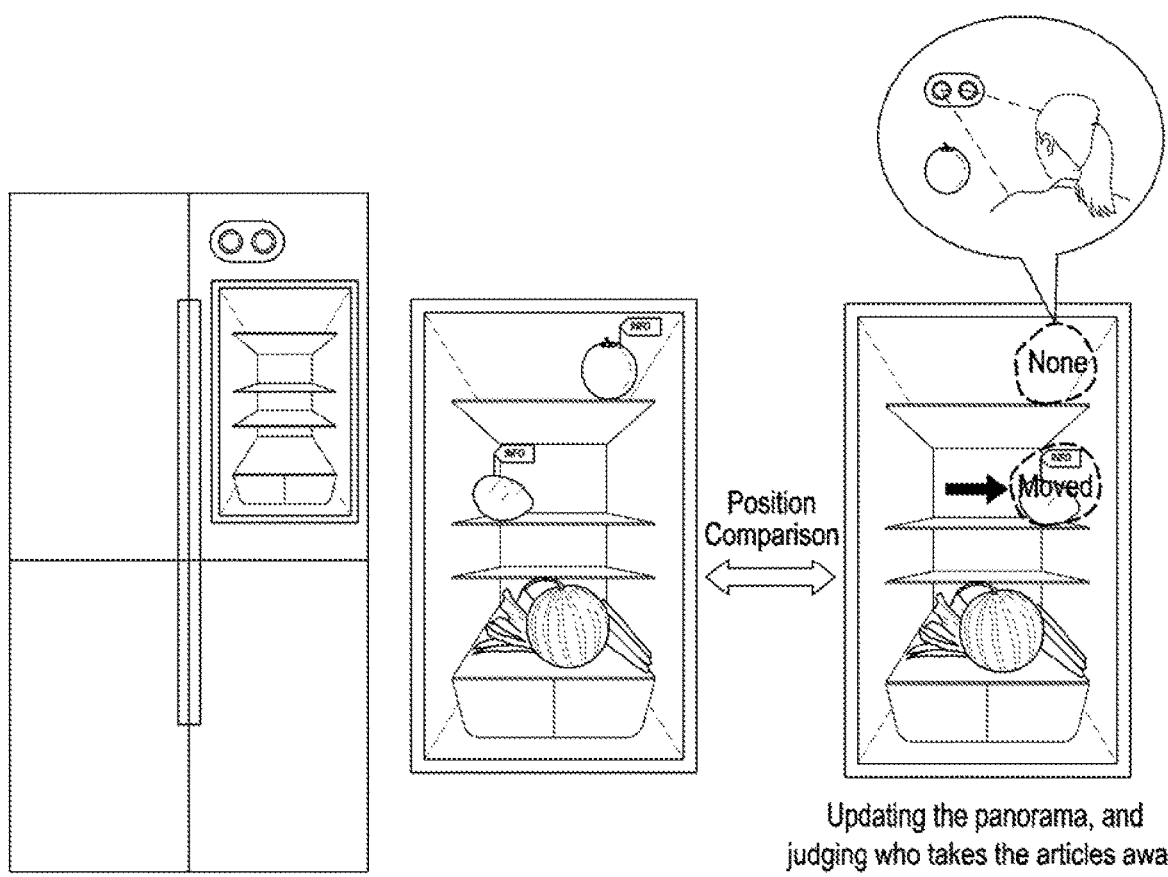
FIG. 6 is a schematic diagram of Example 2.

Example 2: panorama updating (as shown in FIG. 6) including the following steps.

In step 1: a positions of an article is judged through a plurality of cameras inside the refrigerator door.

In step 2: what is moved is judged according to information of comparison between the position of a article placed down by a user and the position of the article after being moved, and a panorama is updated in real time. And in step 3: who takes the article away is judged by the external camera when the refrigerator door is closed if the article has been taken away, and a reminder may be sent to parents if a child takes the article away.

Example 3: AR label setting (as shown in FIG. 7a to FIG. 7d) includes the following steps.

Figure 7A:
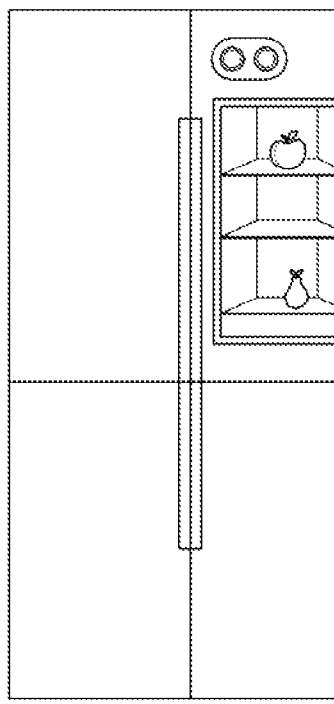
Figure 7A:
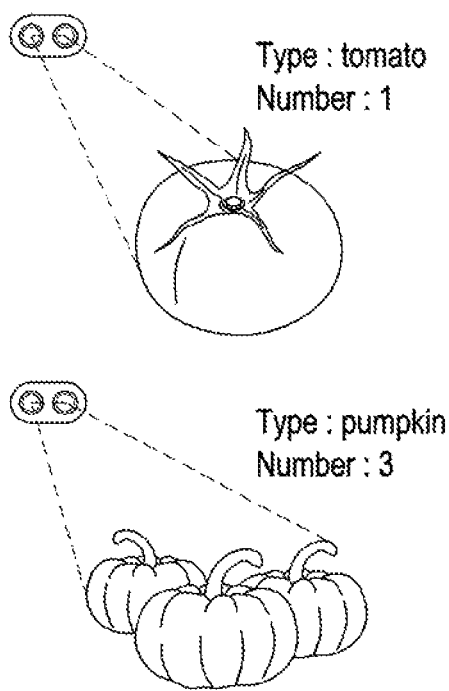

In step 1: the types and quantities of articles is recognized by the external camera on the refrigerator door (FIG. 7a).

In step 2: the food is placed in (FIG. 7b).

Wherein 1) for a single article: a user places in the single article, and the system automatically generates a label and binds to the article.

2) For a plurality of different articles: the user places in a plurality of different varieties of food, and then the system generates labels and binds to the varieties of food sequentially and automatically;

3) For a plurality of identical articles: the user places in a plurality of same variety of food, the food is automatically grouped after being placed in the refrigerator, and a label is generated and bound to the same variety of food; and if the automatic grouping fails, the user may package a plurality of identical articles in a defined area as a whole for setting by drawing a grouping range manually. And 4) for a bag of articles (a bag of fruits) or food contained in a vessel, the bag of articles or the food contained in the vessel may be recognized as a whole in default and a label is established.

Figure 7D:
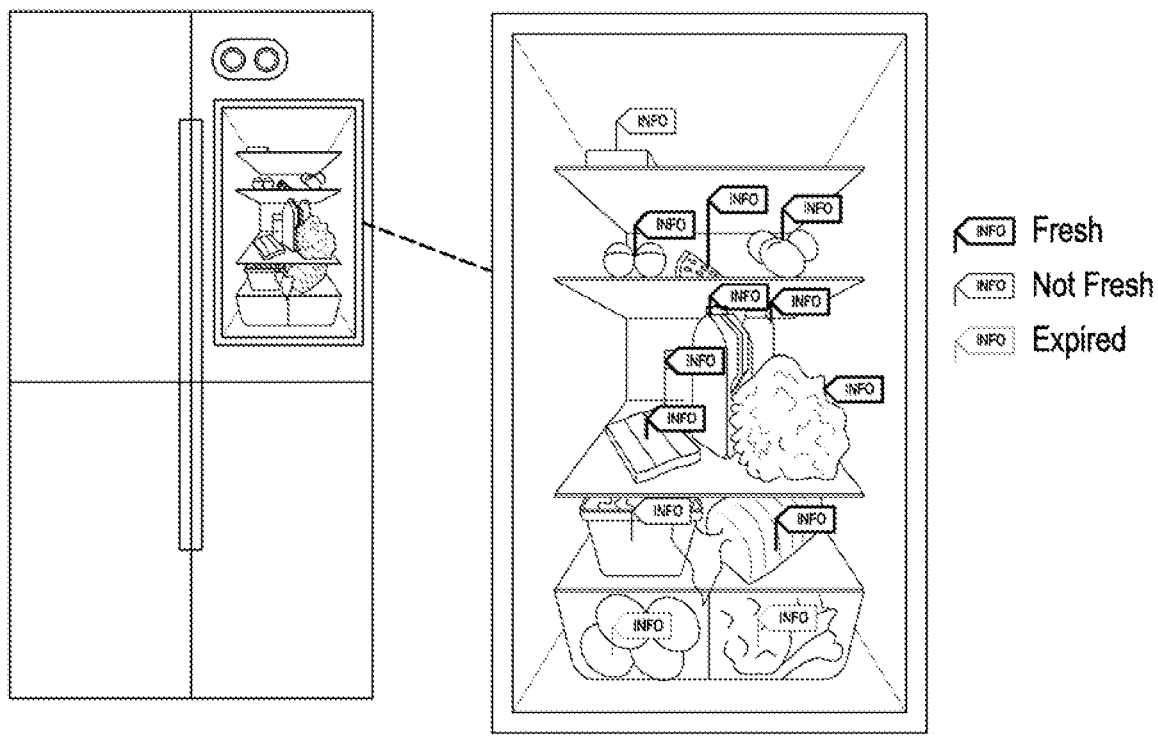

In step 3: the food is moved (FIG. 7c).

Wherein 1) if the user moves the food, the information of the AR label is updated in real time according to changes of the position of articles, and the labels of the articles which are not existed are canceled. Position tracking on moving articles is performed, and when the positions of the articles are changed, the positions of the labels are changed accordingly. And 2) a label is reset for the same article which is regarded as a new article if this article is changed in shape or size after being taken out and then placed in back again (for example, a watermelon cut in half). The system is capable of recommending a possible name of the article to the user after comparison and judgment through the image recognition technology which assists a rapid information inputting; and the information is stored in the storage unit after being confirmed. And in step 4: label states may change with the freshness degrees of the articles, for instance, green indicates fresh, yellow indicates not fresh, and red indicates expired (FIG. 7d).

Figure 8:
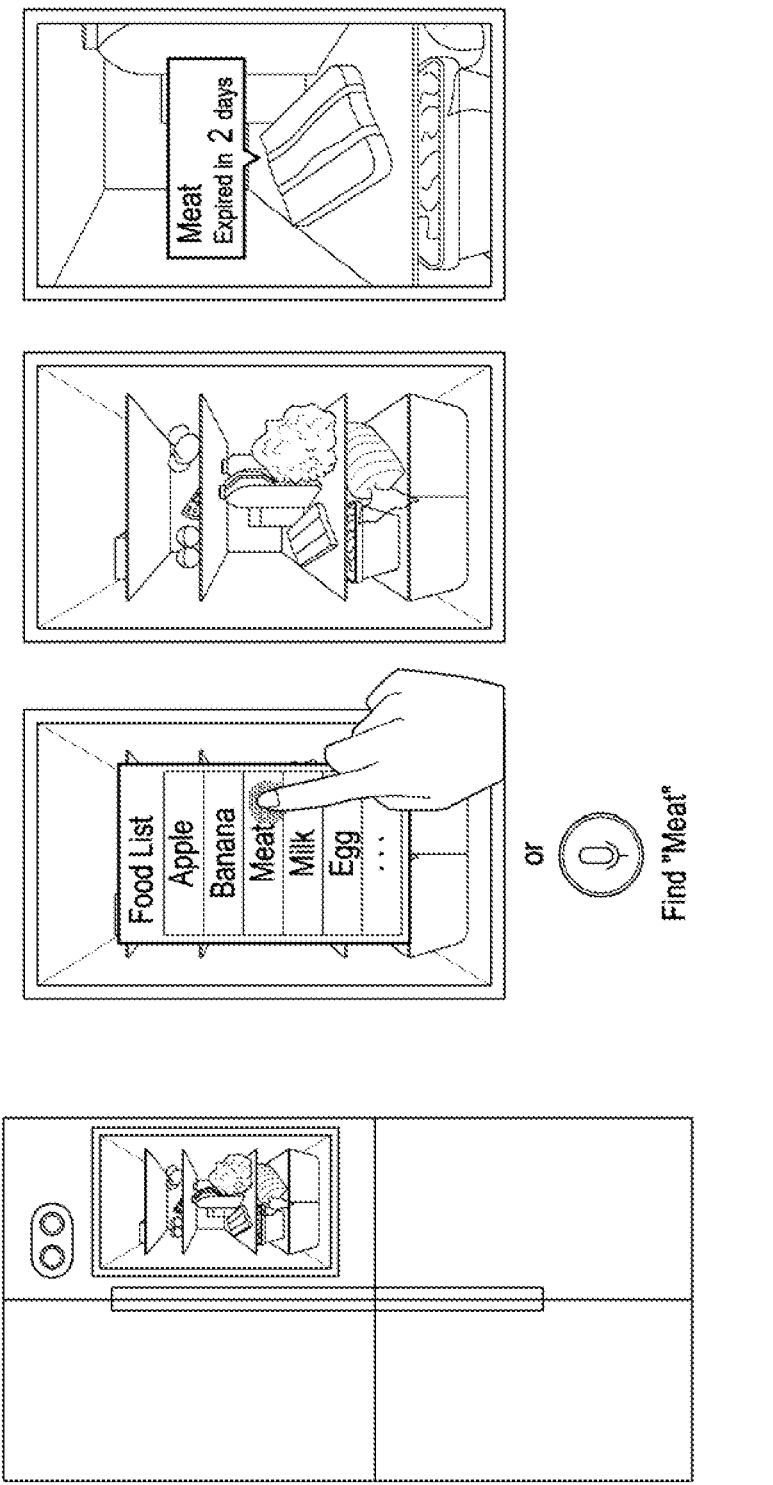
FIG. 8 is a schematic diagram of Example 4.

Example 4: searching food through a food list/voice (as shown in FIG. 8), includes the following steps.

In step 1: a user selects food through the list or searches the food through voice.

In step 2: the system finds a target article and marks out the article from the background and displays the article in a highlighting manner. And in step 3: conversion of visual angle is automatically performed, the position of user viewing and angle of the target article are adjusted and the contents of the AR label of the target article are displayed.

FIG. 4 food is searched: food is searched through the food list/voice.

Figure 9:
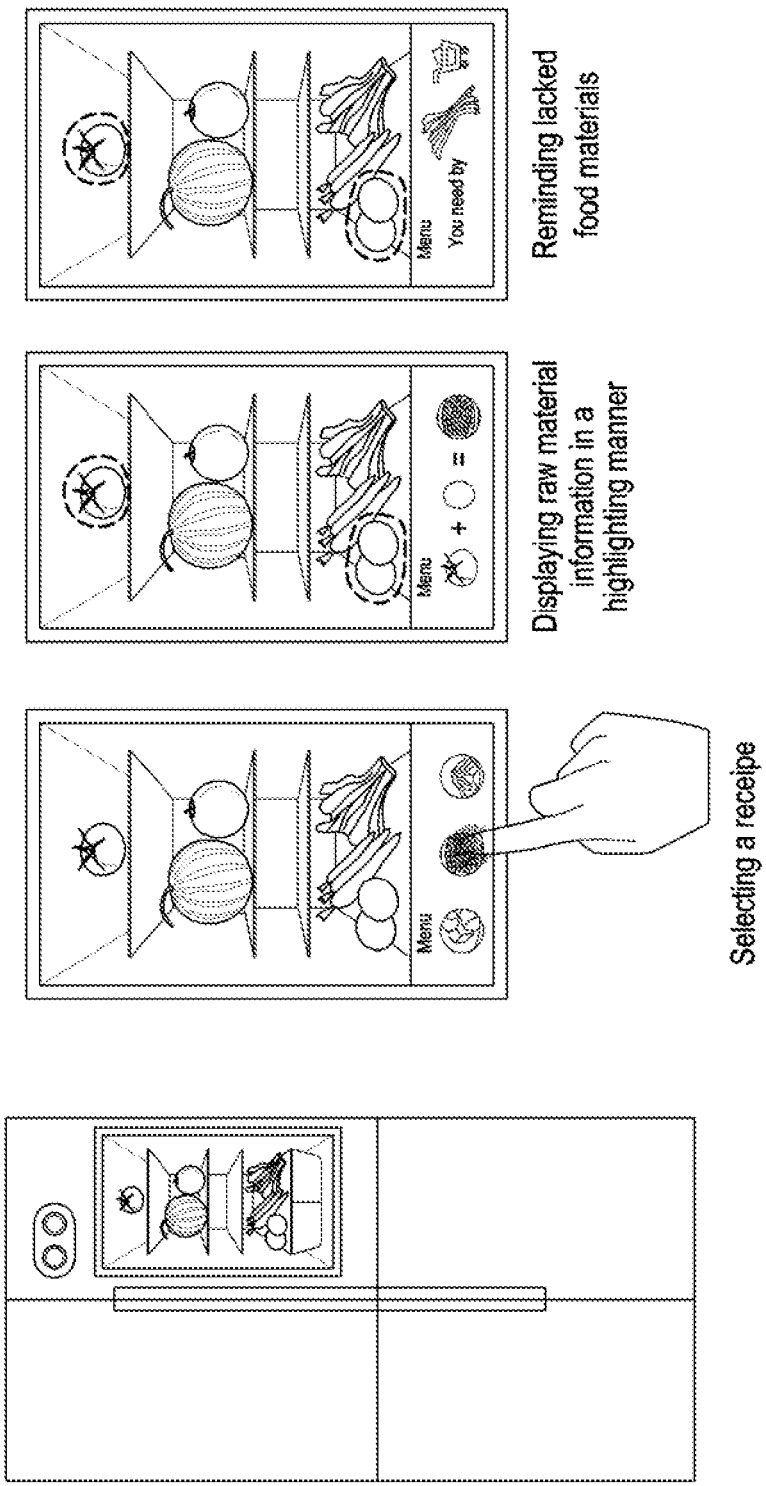
FIG. 9 is a schematic diagram of Example 5.

Example 5: searching food through a recipe (as shown in FIG. 9), includes the following steps.

In step 1: a user selects one recipe.

In step 2: the system inquiries food required in the recommended recipe in the refrigerator and displays the food in a highlighting manner. And in step 3: for material shortage, reminding to purchase the lacked food required in the recipe in the refrigerator is performed.

Figure 10:
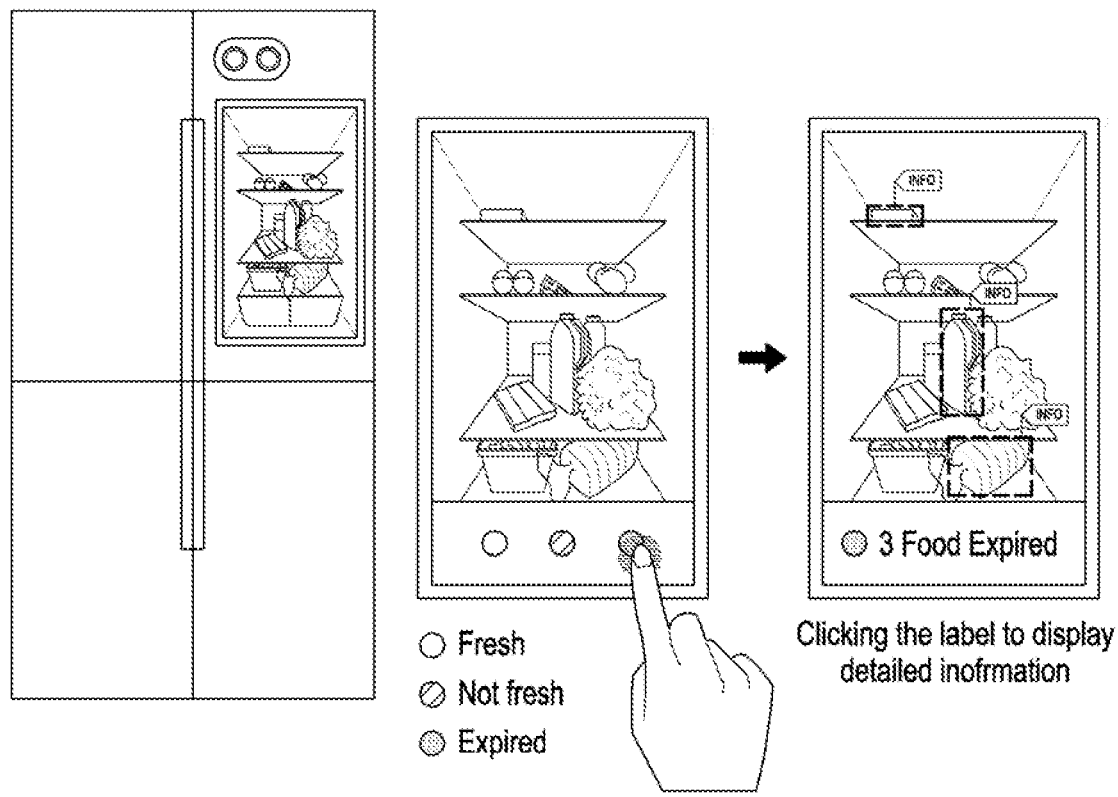
FIG. 10 is a schematic diagram of Example 6.

Example 6: food screening (as shown in FIG. 10), includes the following steps.

In step 1: a user screens and searches food through shelf life classification icons (fresh, not fresh, expired). And in step 2: the system displays all the food meeting the conditions in a highlighting manner.

Figure 11:
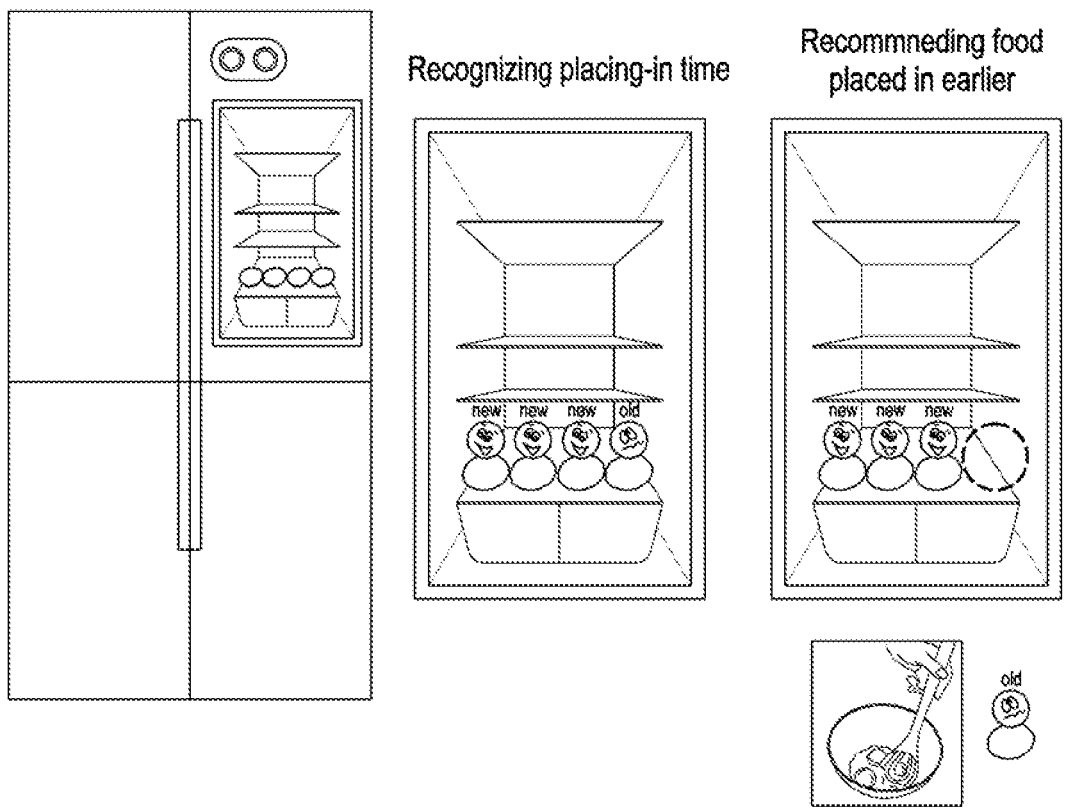
FIG. 11 is a schematic diagram of Example 7.

Example 7: recommending food according to an eating sequence (as shown in FIG. 11), includes the following steps.

Figure 12:
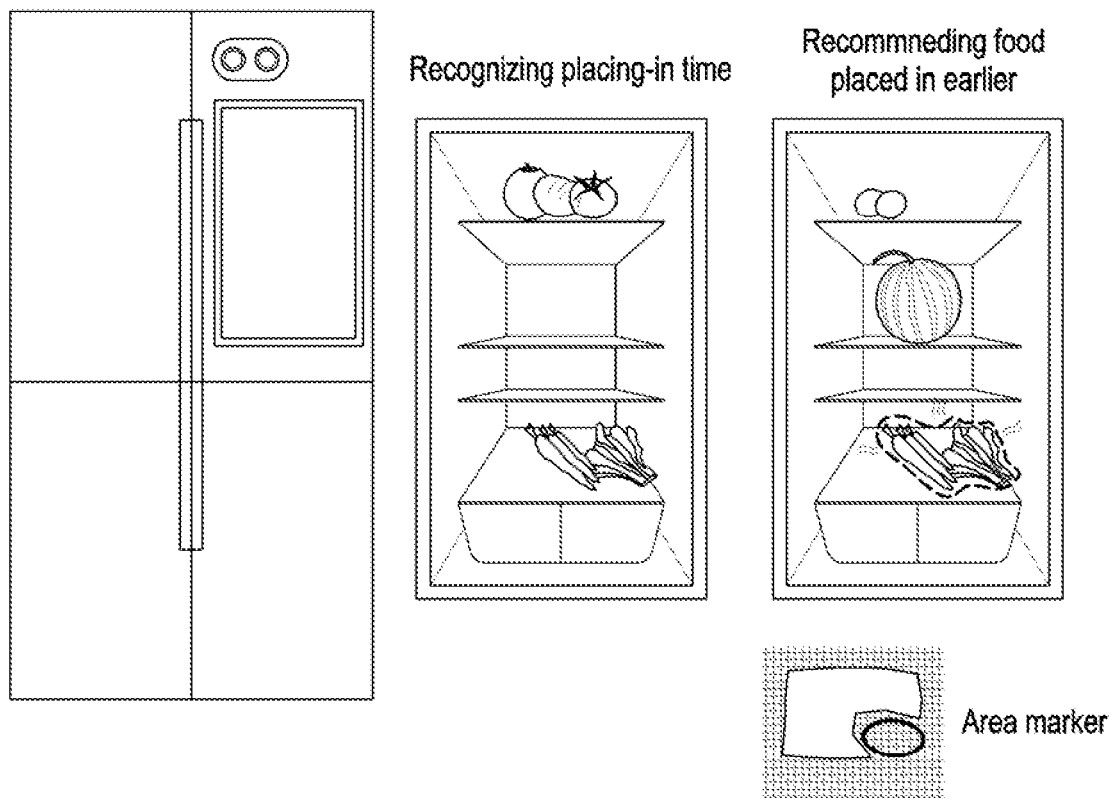
FIG. 12 is a schematic diagram of Example 8.

In step 1: the placing-in time of identical food which are placed in before and after is recognized. And in step 2: the food placed in earlier is recommended to the user to be eaten;

Example 8: reminding: judgment of shelf life and reminding (as shown in FIG. 12), includes the following steps.

In step 1: if the user doesn't input the shelf life information, the refrigerator judges that the food may be possibly expired by recognizing that the article has not been moved or has not disappear for a long time. And in step 2: after a period of time, an area where the article is moved rarely is marked; and with regard to the food already expired, the area or the article will be surrounded by a circle of AR special effect to remind the user that treatment is required here.

Figure 13:
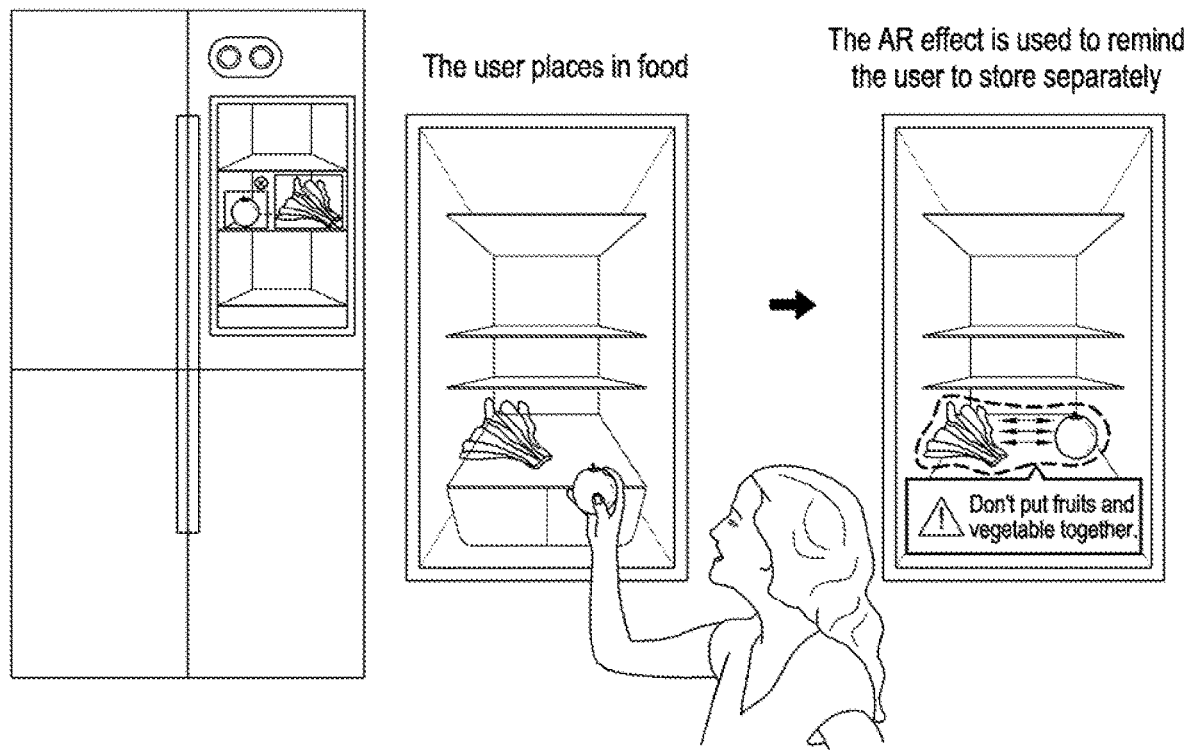
FIG. 13 is a schematic diagram of Example 9.

Example 9: reminding: reminding of placement of food (as shown in FIG. 13) includes the following steps.

In step 1: a user places in food.

In step 2: recognition of image and analysis of the type of the food are performed. And in step 3: if the situations that the vegetables and the fruits are placed together, and the raw food and the cooked food are placed together are detected, an AR effect is provided to remind the user to store them separately.

Figure 14:
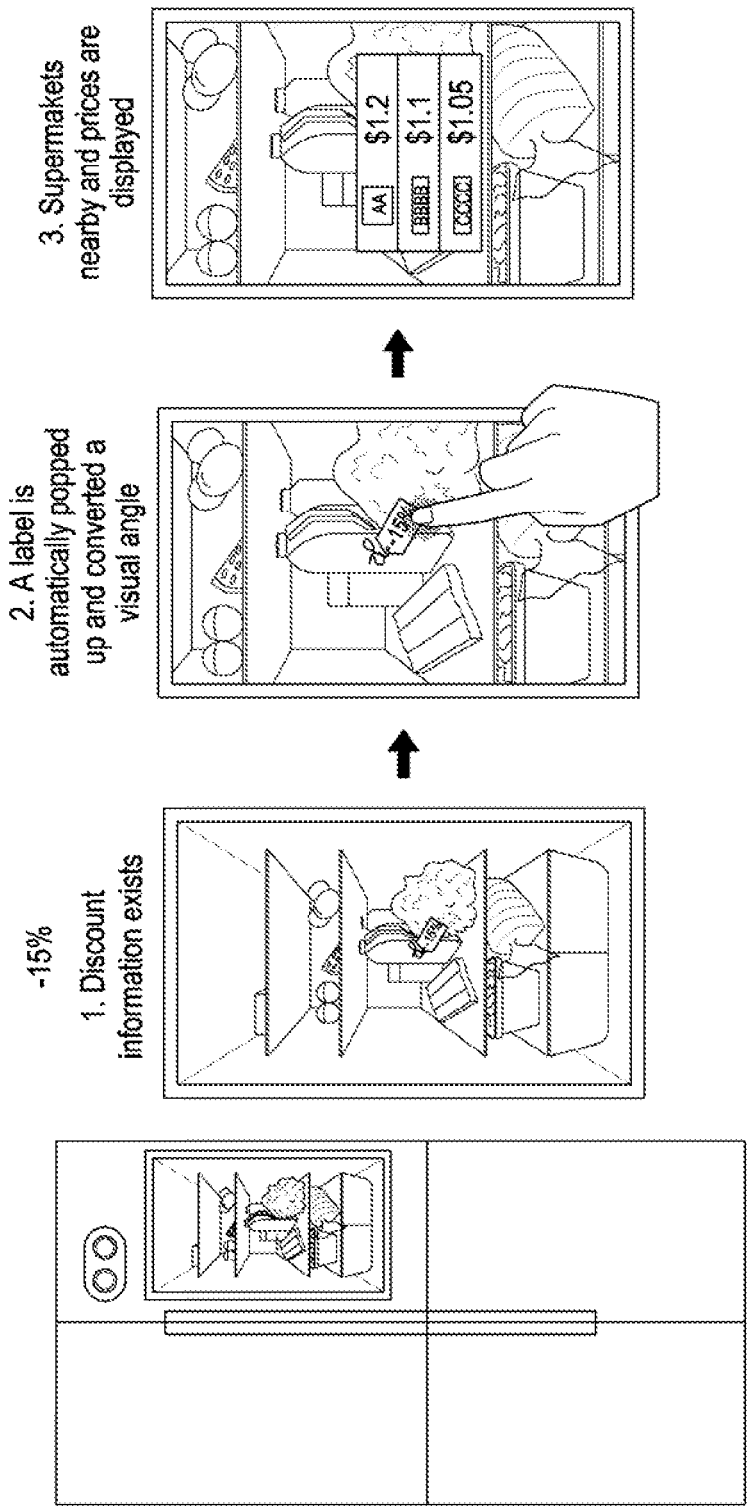
FIG. 14 is a schematic diagram of Example 10.

Example 10: reminding: reminding of change of price (as shown in FIG. 14), includes the following steps.

In step 1: when discount information is existed, a label of food is popped up automatically, and is converted to a visual angle suitable for the user to view. And in step 2: positions of supermarkets nearby and information of commodity price are displayed by clicking the label.

Figure 15:
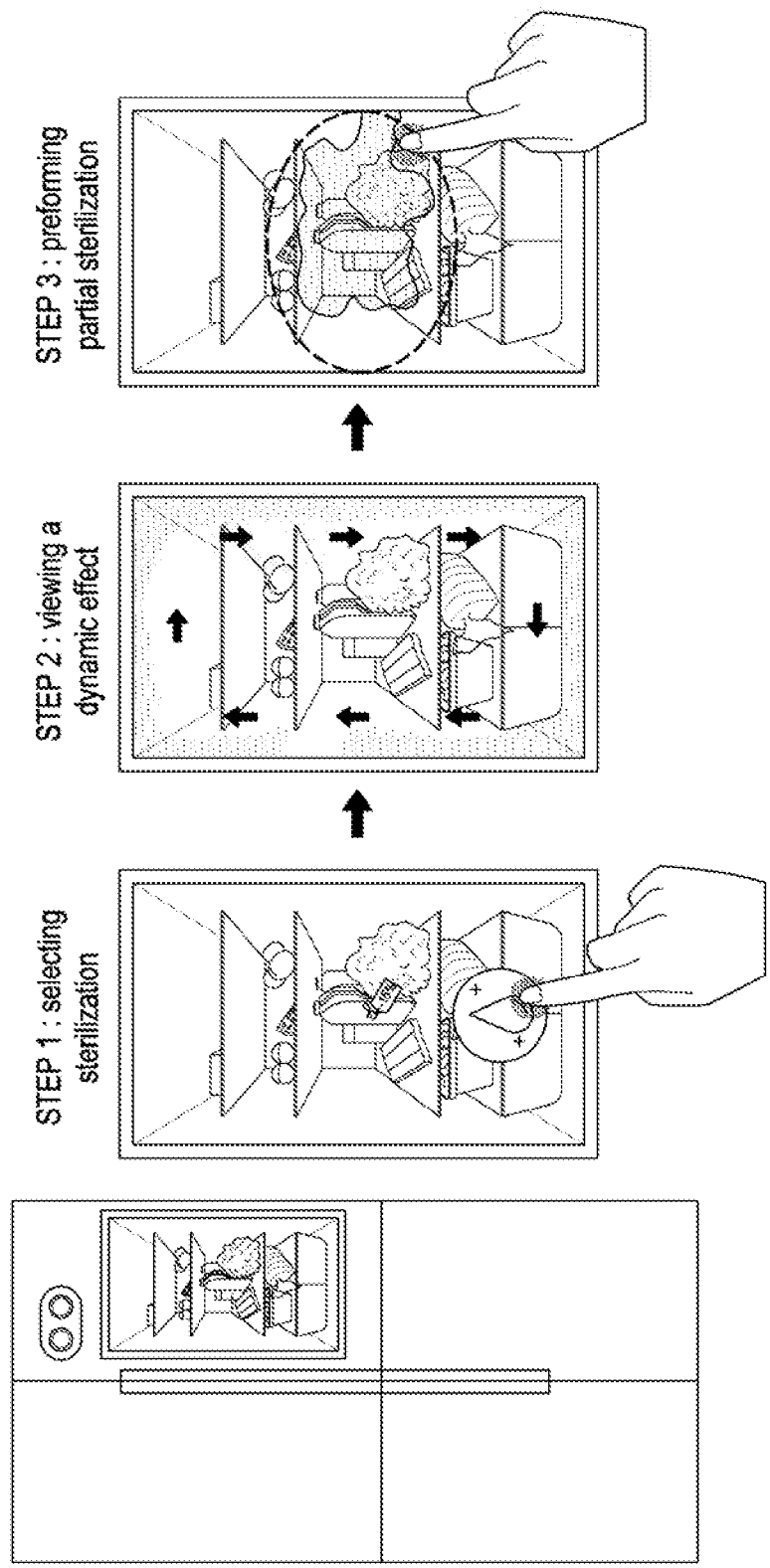
FIG. 15 is a schematic diagram of Example 11.

Example 11: visible AR sterilization (as shown in FIG. 15) includes the following steps.

In step 1: the user selects to sterilize.

In step 2: the user views a sterilization dynamic effect surrounding each layer of food. And in step 3: the user adjusts an angle to view a sterilization state, a sterilization process and detailed information from different positions.

The described above are specific embodiments of the method for managing the food in the refrigerator according to the present application. It can be seen from the described above that the application discloses the method for managing the food in the refrigerator based on an AR panorama. Based on the panorama interaction, convenient management on the food stored in the refrigerator is realized.

Specifically, by means of multi-camera recognition according to this method, the AR panorama of the articles in the refrigerator is formed. The labels of AR information are set for the food placed in the refrigerator, and are bound to the articles and the spatial positions of the articles. The positions of the articles are compared and monitored in real time, and the states of the articles are updated. The managing contents include: label setting, food searching, food screening, eating recommendation, dynamic sterilization and reminding. The interaction feedback is presented in an AR effect mode. Through the scheme above, food information is subject to visible management, and the user can understand the information of the food stored in the refrigerator more conveniently.

The above-described embodiments are merely preferred embodiments of the application and are not intended to be limiting to the invention, and variations, equivalent alternatives, improvements and the like made to the embodiments of the claimed invention within the spirit and principles of the invention shall fall into the protection extent of the invention.

The invention claimed is:

1. A method for managing food by a refrigerator, comprising:
   recognizing a type and quantity of food according to an image captured by at least a part of a plurality of cameras of the refrigerator;
   after storing the food in the refrigerator, determining a position of the food placed in the refrigerator according to images captured by at least a part of the plurality of cameras of the refrigerator;
   generating an augmented reality (AR) label for presenting information of the food placed in the refrigerator, wherein the information of the food comprises at least the type, the quantity and the position of the food;
   displaying the AR label of the food after receiving a query request for the food; and
   displaying at least one real image captured by at least a part of the plurality of cameras after receiving an image viewing request,
   determining a type of other food adjacent to the food using at least a part of the plurality of cameras; and
   recommending to store the food and the other food separately if the type of the food and the type of the other food belong to a predetermined combination.

2. The method of claim 1, wherein the plurality of cameras comprise at least two internal cameras, and each of the at least two internal cameras is placed in a different position,
   wherein the position of the food placed in the refrigerator is a three-dimensional spatial position which is determined according to images captured by the at least two internal cameras, and
   wherein the method further comprises:
      generating an AR panorama according to the images captured by the at least two internal cameras after the AR label is generated; and
      displaying an image captured by a designated internal camera in real-time according to an instruction from a user, when at least one real-time image captured by the at least two internal cameras is displayed.

3. The method of claim 1, further comprising: updating the position of the food in the AR label of the food upon determining that the position of the food is changed using at least a part of the plurality of cameras.

4. The method of claim 2, further comprising: selecting an image captured by another internal camera to display the food, if the food is not displayed completely in the image captured by the designated internal camera.

5. The method of claim 1, further comprising:
   capturing an image of a user who places the food in the refrigerator by at least a part of the plurality of cameras;
   obtaining information of the user; and
   adding the obtained information of the user to the AR label of the food.

6. The method of claim 1, further comprising:
   determining that the food is moved out of the refrigerator using at least a part of the plurality of cameras;
   determining the position of the food in the refrigerator which is moved out of the refrigerator according to the images; and
   determining the information of the food moved out of the refrigerator according to the position; and
   updating the AR label corresponding to the food moved out of the refrigerator.

7. The method of claim 6, further comprising: when the food placed in the refrigerator and the food moved out of the refrigerator are identical in type and different in size and/or shape, recommending the AR label of the food moved out of the refrigerator to a user to act as the AR label of the food placed in the refrigerator.

8. The method of claim 1, wherein the information of the food comprises a shelf life, and
   wherein the method further comprises:
      screening and displaying the food and the AR label of the food through the shelf life of the food after receiving the query request from a user.

9. The method of claim 8, wherein the shelf life of the food is determined according to user input, placing-in time, or a shelf life of similar food; and,
   wherein the method further comprises: upon determining that the shelf life of the food is expired, reminding the user that the shelf life of the food is already expired.

10. The method of claim 1, wherein the information of the food comprises placing-in time, and
    wherein the method further comprises: recommending the food having earlier placing-in time to a user after receiving a recommendation request from the user.

11. The method of claim 1, wherein the predetermined combination comprises at least one of 'vegetables and fruits', 'raw food and cooked food', and 'foodstuff and medicines'.

12. The method of claim 10, further comprising:
    selecting the food in a designated time period according to the placing-in time of the food in response to a request of the user;
    marking out the selected food from a background of; and
    displaying an image of the selected food in a highlighting manner, when the information of the food comprises the placing-in time.

13. The method of claim 1, further comprising:
    reminding a user that some food is possibly expired, upon determining that a storage period of the food in the refrigerator exceeds a first set time period, based on a placing-in time of the food and the images; and,
    reminding the user that some food is possibly expired, upon determining that the storage period of the food which has not been moved in the refrigerator exceeds a second set time period, based on the placing-in time and the position of the food and the images.

14. The method of claim 1, further comprising: searching price information of the food on the Internet according to label information of the food, and showing a search result to a user.

15. The method of claim 1, further comprising: selecting food and label information of the food according to a recipe designated by a user and showing the food and label information of the food to the user.

16. A refrigerator for managing food, comprising:
    a plurality of cameras; and
    processing units configured to:
       recognize a type and quantity of food according to an image captured by at least a part of the plurality of cameras,
       after storing the food in the refrigerator, determine a position of the food placed in the refrigerator according to images captured by at least a part of the plurality of cameras, generate an augmented reality (AR) label for presenting information of the food placed in the refrigerator, wherein the information of the food comprises at least the type, the quantity and the position of the food,
display the AR label of the food after receiving a query request for the food,
display at least one real-time image captured by at least a part of the plurality of cameras after receiving an image viewing request,
determine a type of other food adjacent to the food using at least a part of the plurality of cameras, and
recommend to store the food and the other food separately if the type of the food and the type of the other food belong to a predetermined combination.

* * * * *